Dec. 22, 1953  N. E. EARLE ET AL  2,663,844
CONTACT FIXTURE
Filed March 29, 1951  3 Sheets-Sheet 1
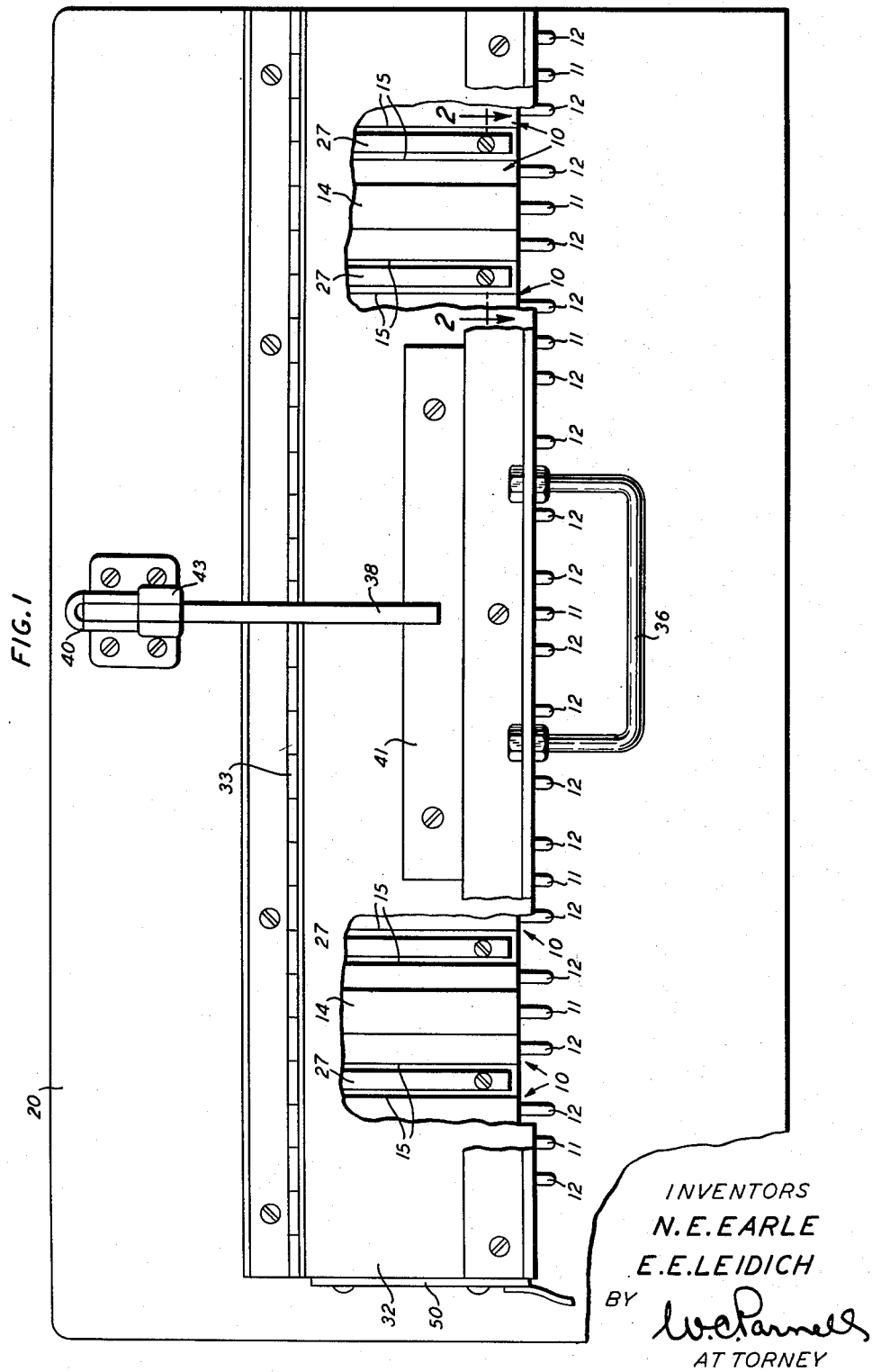
INVENTORS
N.E. EARLE
E.E. LEIDICH
BY
AT TORNEY Dec. 22, 1953 N. E. EARLE ET AL 2,663,844
CONTACT FIXTURE
Filed March 29, 1951 3 Sheets-Sheet 2
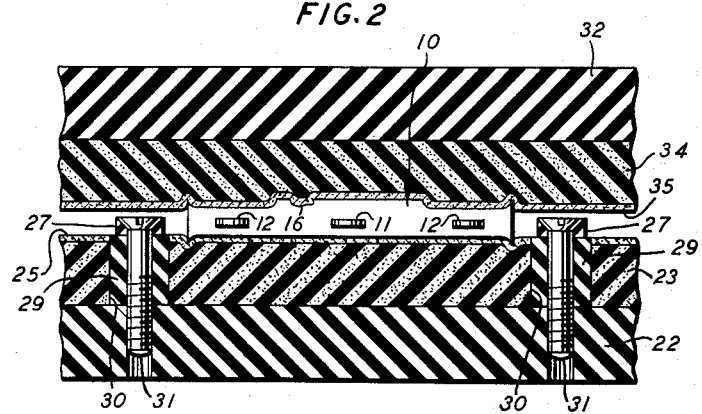
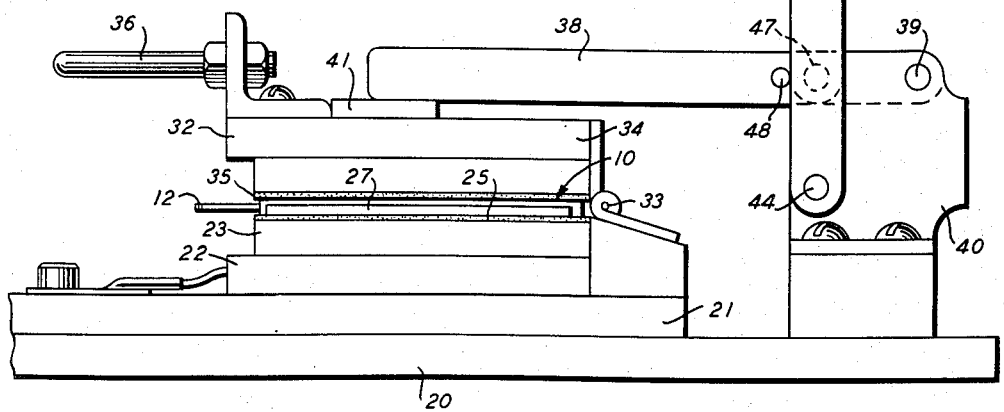
INVENTORS
N. E. EARLE
E. E. LEIDICH Dec. 22, 1953  N. E. EARLE ET AL  2,663,844
CONTACT FIXTURE
Filed March 29, 1951  3 Sheets-Sheet 3
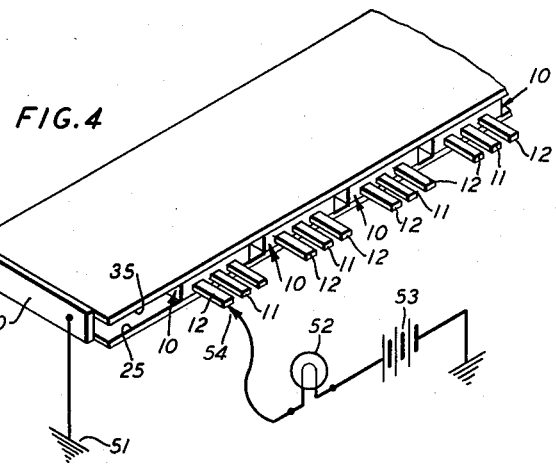
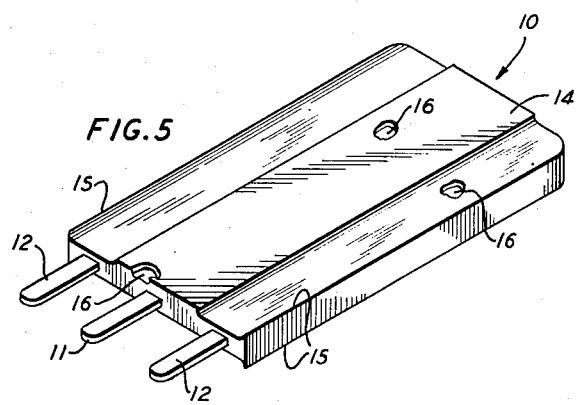
INVENTORS
N. E. EARLE
E. E. LEIDICH
BY
ATTORNEY Patented Dec. 22, 1953

2,663,844

UNITED STATES PATENT OFFICE 2,663,844

CONTACT FIXTURE

Norman E. Earle, Groveland, and Edwin E. Leidich, Merrimac, Mass., assignors to Western Electric Company, Incorporated, New York, N. Y., a corporation of New York Application March 29, 1951, Serial No. 218,118

1 Claim. (Cl. 324—51)

This invention relates to apparatus for testing electrical units having portions with irregular contours and more particularly to apparatus for detecting discontinuities in the insulating coverings of electrical units.

In the manufacture of certain types of coils for use in the communication arts, the coils are embedded in a fibrous insulating material after which a selected number of the coil units are placed in stacked formation for the complete assembly of a given number in the finished article. It is important that the insulating covering of each electrical unit be complete and free of any open portions which would expose the windings of the coils so that when they are placed in stacked formation, the alignment of open portions might create short circuits in the coils. The electrical units must be tested to determine the presence of any discontinuities in the insulated coverings which frequently are not apparent to the naked eye. To accomplish this result satisfactorily, it is necessary to provide in the test circuit a conductive element which is capable of conforming to a given surface of the electrical unit under test including all of its irregularities resulting from the initial forming of the insulating material about the coils together with the presence of open areas so that the conductive material may extend into and form electrical contact with exposed portions of the coils.

An object of the invention is to provide a testing apparatus for electrical units which is simple in structure yet highly efficient in accurately engaging irregular contours of an article under test including portions exposed due to the absence of dielectric material.

With this and other objects in view, the invention comprises an apparatus for testing electrical units having portions with irregular contours, such as open portions in the insulation coverings for electrical coils or the like, the apparatus including a contact element having a flexible facing of conductive material and a resilient backing member capable under pressure of forcing the conductive material into contact with the portions of the units.

In the present embodiment of the invention it is important that the sides of the electrical unit be tested for discontinuities in the insulating material forming the covering for the coils. Therefore, two flexible facings of contact elements are formed of conductive material secured to resilient members, such as sponge rubber members, movable relative to each other by suitable means such as a series of levers so that the unit under test may be clamped in such a manner as to cause the flexible facings to conform to their respective surfaces of the unit and to enter any open portions to electrically engage the exposed convolutions of the coils. In this manner by including the contact elements in a circuit with a signal, the operator may successively include the coils in the testing circuit through electrical engagement with the terminals thereof whereby any short circuit through the opening of the insulation would complete a circuit through the signal of the test set.

Other objects and advantages will be apparent from the following detailed description when considered in conjunction with the accompanying drawings wherein:

Fig. 1 is a top plan view of the apparatus, portions thereof being broken away;

Fig. 2 is an enlarged fragmentary sectional view taken along the line 2—2 of Fig. 1;

Fig. 3 is a side elevational view of the apparatus;

Fig. 4 is an isometric view of the contact elements with their resilient backing members closed upon a series of electrical units under test and included selectively in the testing circuit;

Fig. 5 is an isometric view of one of the electrical units to be tested.

Referring now to the drawings, attention is first directed to Fig. 5 illustrating one of the electrical units 10 to be tested. The electrical unit 10 is composed of two coils (not shown) provided with a common central terminal 11 and individual end terminals 12. The coils and the inner ends of their terminals are completely embedded in a covering 14 of insulating material. This insulating material is fibrous and provided with a suitable binding agent so that when it is compressed and dried, it will presumably completely cover the coils and all except the desired lengths of the terminals 11 and 12. During the pressing or forming of the insulated covering 14 certain irregularities may appear including outwardly projecting fins 15 which in the present instance are exaggerated purposely to show the efficiency of the contact elements hereinafter described. Furthermore, for the purpose of illustration, open portions 16 may appear in either or both of the sides of the covering 14. The presence of openings of this kind in the edges of the covering is of no importance, but such openings are of vital importance should they appear in either side of the covering due to the fact that the units 10 are to be stacked in selected groups and the presence of exposed convolutions of either coil may result in shorts between coils of adjacent units.

The apparatus includes a base 20 upon which a member 21 is mounted to receive a stationary support 22. The support 22 has a resilient backing member 23 of a desired length mounted thereon, whereby a plurality of the electrical units 10 may be tested simultaneously. The backing member 23 is formed of a suitable resilient material such as sponge rubber and has a contact element 25 secured or otherwise mounted on its upper surface. The contact element may be a sprayed coating of a suitable thickness of conductive material completely covering the upper surface of the member 23. The member 23 may also be glued or otherwise secured to its support 22. It has been found advantageous to provide given spaces on the contact element 25 for the electrical units 10 to be suitably located so that they will not interfere with each other and will prevent the operator from attempting to crowd more than a predetermined number of the units in the apparatus during one testing operation. The spacing means includes laterally extending bars 27 supported near their ends by sleeves 29 extending through apertures 30 in the member 23 and secured to the stationary member 22 by screws 31. A movable support 32 hinged at 33 is provided for a resilient backing member 34 similar to the backing member 23 and provided with the same type of flexible conductive element 35 on its undersurface. A handle 36 is provided for moving the movable support into open position during loading and unloading of the apparatus.

Suitable means is provided to hold the apparatus in closed position under pressure. This means includes an arm 38 pivotally supported at 39 on a bracket 40, the forward end of the arm positioned to engage a member 41 on the movable support 32. A handlever 43 pivotally supported at 44 near its lower end is connected at 45 to a link 46, the other end of the link being pivotally connected at 47 to the arm 38. A pin 48 carried by the arm 38 limits the counterclockwise movement of the lever 43 and serves in locating the lever in its operated or hold-down position.

The schematic illustration of the testing circuit includes a suitable conductive element 50 capable of connecting the contact elements 25 and 35 to ground 51. The circuit, including a suitable indicating signal or lamp 52, extends from grounded battery 53 to a contact 54 which may be moved singly into engagement with the outer terminals 12 of the electrical units under test.

Considering now the operation of the apparatus, it will be apparent that movement of the handlever 43 in a clockwise direction will release the arm 38 for movement about its pivot 39 so that the operator may move the upper or movable portion of the apparatus about the hinge or pivot 33. When the apparatus is in its open position, electrical units 10 which have been tested may be removed therefrom and sorted according to the results of their test. Also, other electrical units to be tested may be placed in their respective compartments on the lower or stationary contact element 25 between the transverse spacing bars 27. The apparatus is then closed by the operator lowering the upper or movable portion thereof until it rests upon the units to be tested after which counterclockwise motion of the lever 43 will force the arm in the same direction causing it to apply a predetermined pressure on the movable portion of the apparatus. This desired pressure applied through the operation of the arm 38 causes each unit under test to be forced downwardly so that the contact element 25 will conform to the adjacent surfaces thereof regardless of the contour of the surfaces. The same condition will exist between the movable contact element 35 and the upper surfaces of the units under test. This is made possible first due to the extremely flexible nature of the contact elements 25 and 35, and second, due to the resilient backing for each element embodied in the members 23 and 34. It is illustrated in Fig. 2 that even the presence of outwardly projecting fins 15 will not prevent the flexible contact elements from completely conforming to their respective surfaces extending into open portions of the insulating material when such are present to form electrical contact with the coils or the inner structures of the units.

When the apparatus is closed, the operator then moves the contact 54 successively into engagement with the outer terminals of each unit under test. If there should be a defect or open portion in the insulation of any of the units, these defects will result in the energization of the lamp 52 indicating also the particular coil of the unit which is affected due to the presence of an opening in the insulation. When all of the units have been tested, the apparatus may be opened and the tested units removed, the operator separating the defective units from those which have passed the test.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for use in combination with a testing circuit for testing electrical units for possible discontinuities in insulating coverings on conductve portions thereof, the apparatus comprising a shelf-like support and an element pivotally mounted relative to the support and movable into open and closed positions, resilient members secured to the respective upper and lower surfaces of the support and element, spacers mounted at selected positions adjacent the member on the support to locate the electrical units at spaced positions thereon, flexible contact surfaces, connected to the testing circuit, secured to the adjacent surfaces of the resilient members to engage the electrical units to be tested, means to include the conductive portions of the units in the testing unit singly, and means to force the element into closed position to compress the resilient members whereby the flexible contact elements will conform to their respective surfaces of the electrical units and enter any open portions in the insulated coverings to close the circuit through the conductive portions thereof.

NORMAN E. EARLE.
EDWIN E. LEIDICH.

References Cited in the file of this patent

UNITED STATES PATENTS

| Number | Name | Date |
| --- | --- | --- |
| 1,561,483 | Pickard | Nov. 17, 1925 |
| 1,927,045 | Parsons | Sept. 19, 1933 |
| 1,953,155 | Currier | Apr. 3, 1934 |
| 2,379,947 | Bandur | July 10, 1945 |
| 2,426,246 | Skinker | Aug. 26, 1947 |
| 2,478,414 | Michal | Aug. 9, 1949 |
| 2,480,142 | Lager | Aug. 30, 1949 |